US009578632B2

(12) United States Patent
Chen et al.

(10) Patent No.: US 9,578,632 B2
(45) Date of Patent: Feb. 21, 2017

(54) METHODS AND APPARATUS FOR UL DM-RS OVERHEAD REDUCTION

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 14/618,767

(22) Filed: Feb. 10, 2015

(65) Prior Publication Data

US 2015/0282158 A1 Oct. 1, 2015

Related U.S. Application Data

(60) Provisional application No. 61/971,465, filed on Mar. 27, 2014.

(51) Int. Cl.
*H04L 5/14* (2006.01)
*H04B 7/00* (2006.01)
(Continued)

(52) U.S. Cl.
CPC ........ *H04W 72/0413* (2013.01); *H04L 5/0003* (2013.01); *H04L 5/0007* (2013.01);
(Continued)

(58) Field of Classification Search
CPC ................... H04W 72/0413; H04W 72/0493; H04W 72/1278; H04W 72/1284; H04L 5/0044; H04L 5/0003
See application file for complete search history.

(56) References Cited

U.S. PATENT DOCUMENTS

2011/0141928 A1* 6/2011 Shin ................. H04L 1/0028
370/252
2013/0083753 A1* 4/2013 Lee .................. H04W 72/0453
370/329
(Continued)

FOREIGN PATENT DOCUMENTS

EP 2493092 A2 8/2012
WO 2013165570 A1 11/2013

OTHER PUBLICATIONS

International Search Report and Written Opinion—PCT/US2015/015487—ISA/EPO—Apr. 22, 2015.
(Continued)

*Primary Examiner* — Faruk Hamza
*Assistant Examiner* — Abu-Sayeed Haque
(74) *Attorney, Agent, or Firm* — Arent Fox LLP

(57) ABSTRACT

In certain circumstances, the uplink resources (e.g., overhead) used for transmission of the UL DM-RS may be excessive, consuming an unnecessary amount of the available uplink spectrum. While there is a balance between the number of DM-RS and the reliability of the shared data channel, reduction of the UL DM-RS overhead may enable the UE to increase the number of transmissions in a UL subframes. Various DM-RS reduction techniques discussed include reducing the number of UL DM-RS generally, per resource block, or per pairs of resource units, and accommodating transmission of uplink control channel information when UL DM-RS is reduced. Further disclosed techniques relate to adjusting the number of UCI in the uplink shared channel.

28 Claims, 11 Drawing Sheets

(51) Int. Cl.
*H04L 12/28* (2006.01)
*H04J 3/00* (2006.01)
*H04W 72/04* (2009.01)
*H04L 5/00* (2006.01)

(52) U.S. Cl.
CPC .......... *H04L 5/0044* (2013.01); *H04L 5/0051* (2013.01); *H04L 5/0053* (2013.01)

(56) References Cited

U.S. PATENT DOCUMENTS

| | | | | |
|---|---|---|---|---|
| 2013/0114756 A1* | 5/2013 | Jia | ........................... | H04J 11/00 |
| | | | | 375/295 |
| 2014/0133395 A1* | 5/2014 | Nam | .................... | H04B 7/0452 |
| | | | | 370/328 |
| 2014/0286255 A1* | 9/2014 | Nam | .................... | H04L 1/1861 |
| | | | | 370/329 |
| 2014/0362832 A1* | 12/2014 | Rudolf | ................. | H04L 1/1822 |
| | | | | 370/336 |

OTHER PUBLICATIONS

Love R., et al., "Uplink Physical Channel Structure", Aug. 8, 2011 (Aug. 8, 2011), LTE—The UMTS Long Term Evolution: From Theory to practice, Wiley, Chichester, GB, pp. 343-370, XP007920961, ISBN: 978-0-470-97864-1 Subsection 16.3.2 Subsection 16.3.6.

* cited by examiner

METHODS AND APPARATUS FOR UL DM-RS OVERHEAD REDUCTION

CROSS-REFERENCE TO RELATED APPLICATION(S)

This application claims the benefit of U.S. Provisional Application Ser. No. 61/971,465, entitled "SOME DETAILS FOR UL DM-RS OVERHEAD REDUCTION IN LTE" and filed on Mar. 27, 2014, which is expressly incorporated by reference herein in its entirety.

BACKGROUND

Field

The present disclosure relates generally to communication systems, and more particularly, to the application of UL DM-RS overhead reduction in LTE.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies. In the LTE standard, the UL demodulation reference signal (DM-RS) transmitted by a UE in a UL subframe typically has a fixed overhead. For example, the UL DM-RS may be transmitted in fixed symbol positions for a cyclic prefix (CP) type. Moreover, the UE may also transmit uplink control information (UCI) to the base station in the UL subframe.

SUMMARY

In certain circumstances, the uplink resources (e.g., overhead) used for transmission of the UL DM-RS may be excessive, consuming an unnecessary amount of the available uplink spectrum. While there is a balance between the number of DM-RS and the reliability of the shared data channel, reduction of the UL DM-RS overhead may enable the UE to increase the number of transmissions in a UL subframes. Various DM-RS reduction techniques discussed include reducing the number of UL DM-RS generally, per resource block, or per pairs of resource units, and accommodating transmission of uplink control channel information when UL DM-RS is reduced. Further disclosed techniques relate to adjusting the number of UCI in the uplink shared channel.

Accordingly, in an aspect of the disclosure, a method, a computer program product, and an apparatus are provided. The apparatus may determine whether to apply a DM-RS overhead reduction scheme for an uplink subframe, identify a UCI transmission scheme for the uplink subframe based on whether the DM-RS overhead reduction scheme is applied, and transmit the UCI in the uplink subframe using the UCI transmission scheme.

DETAILED DESCRIPTION

Figure 1:
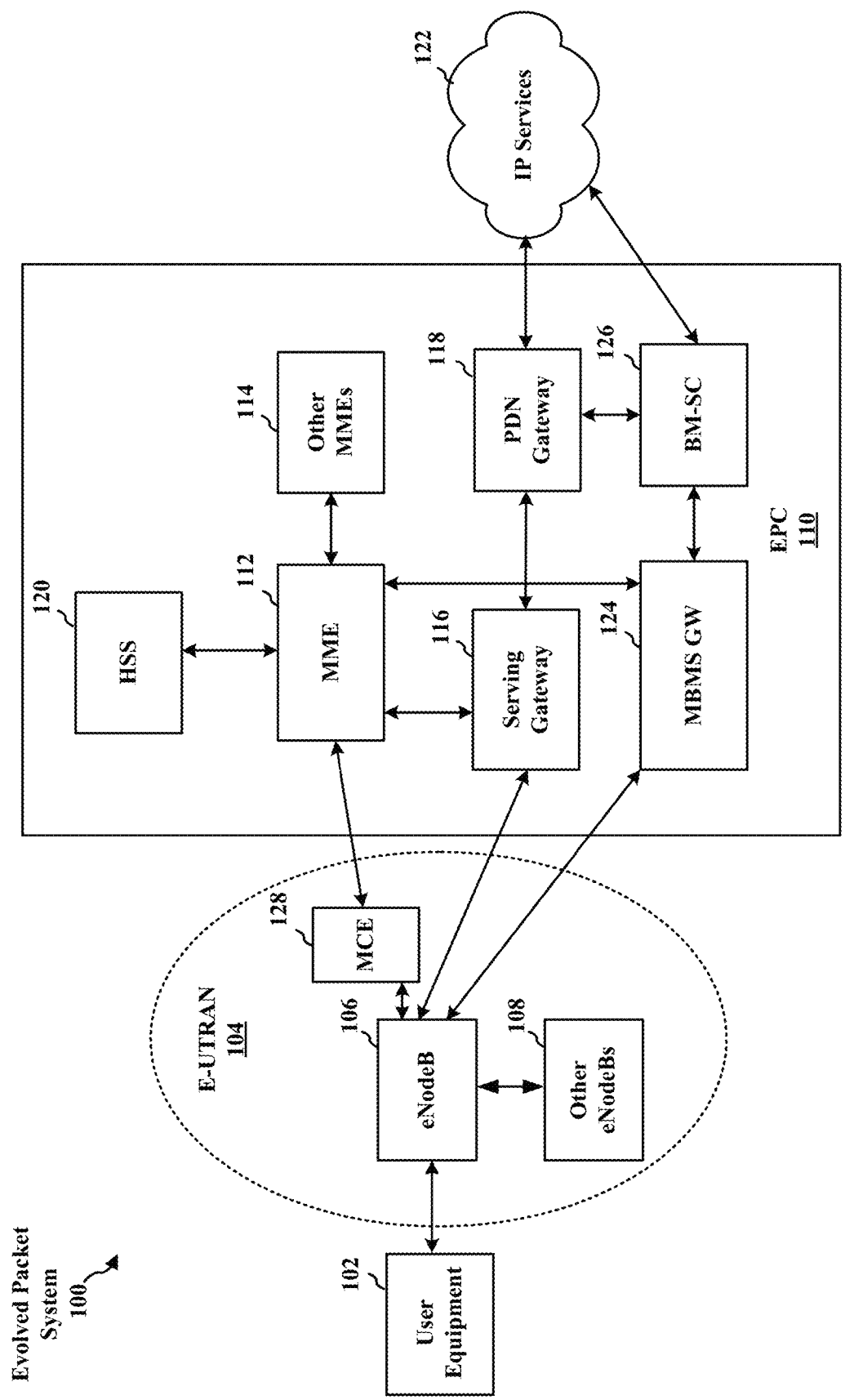
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
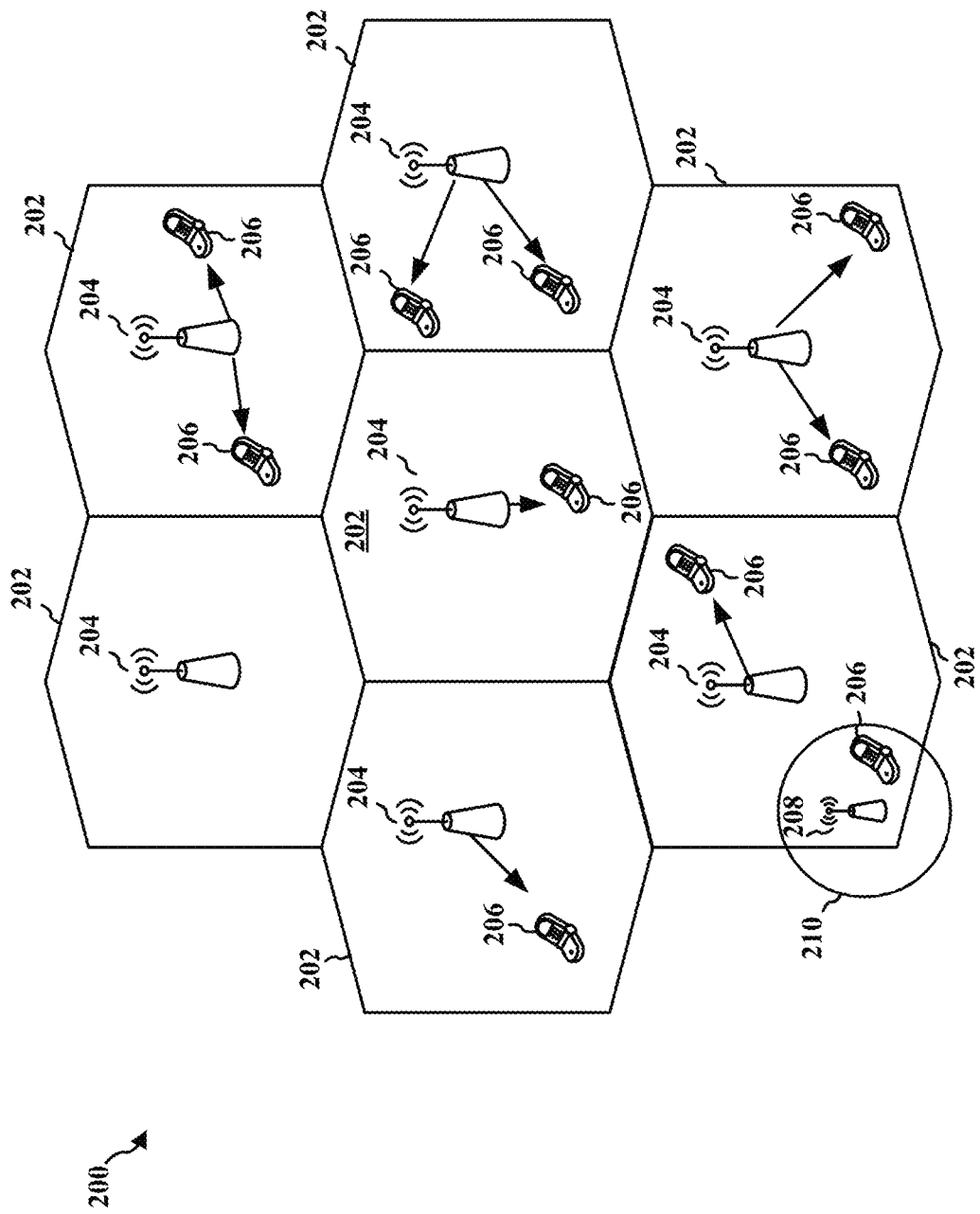
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
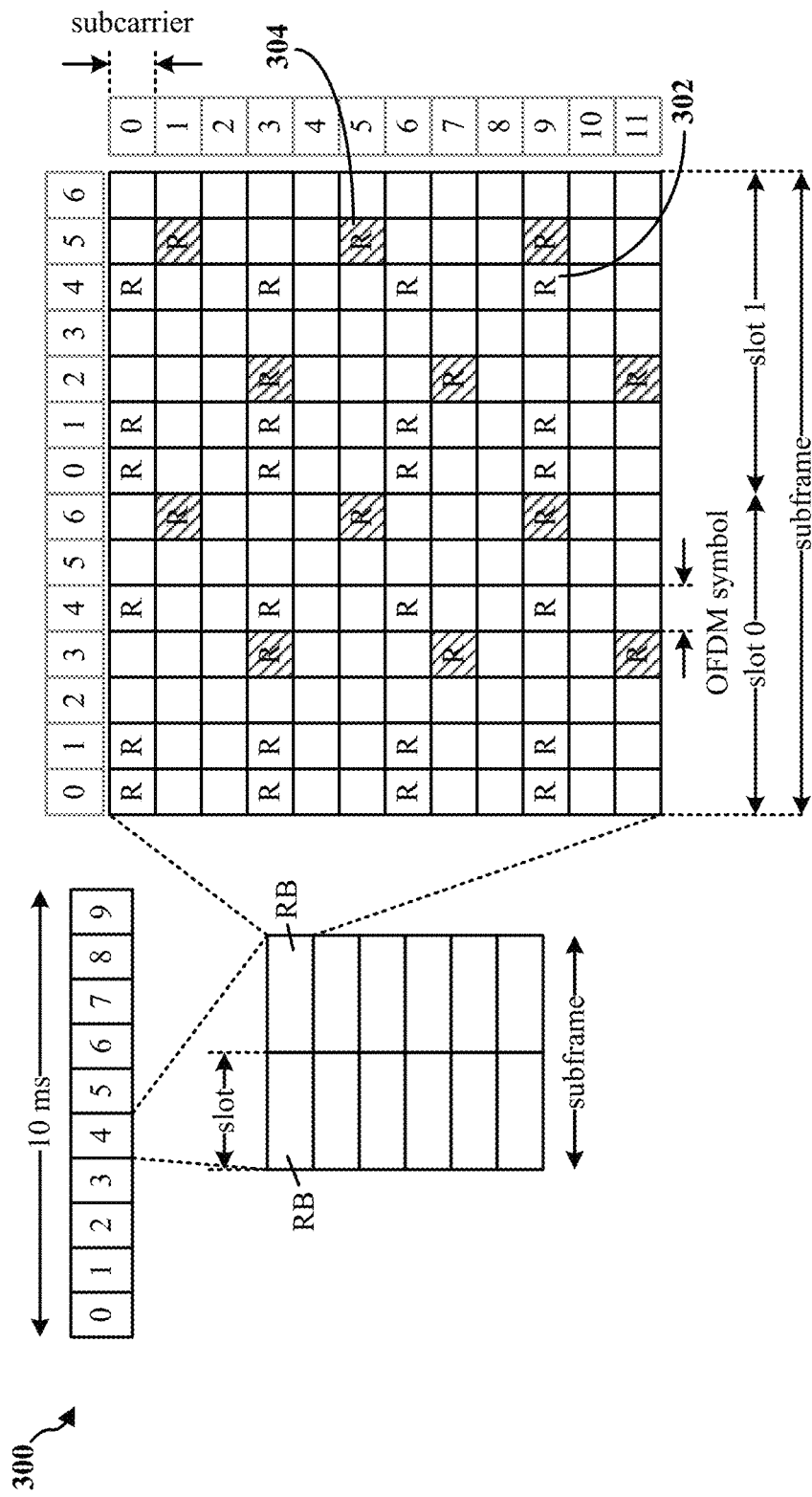
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
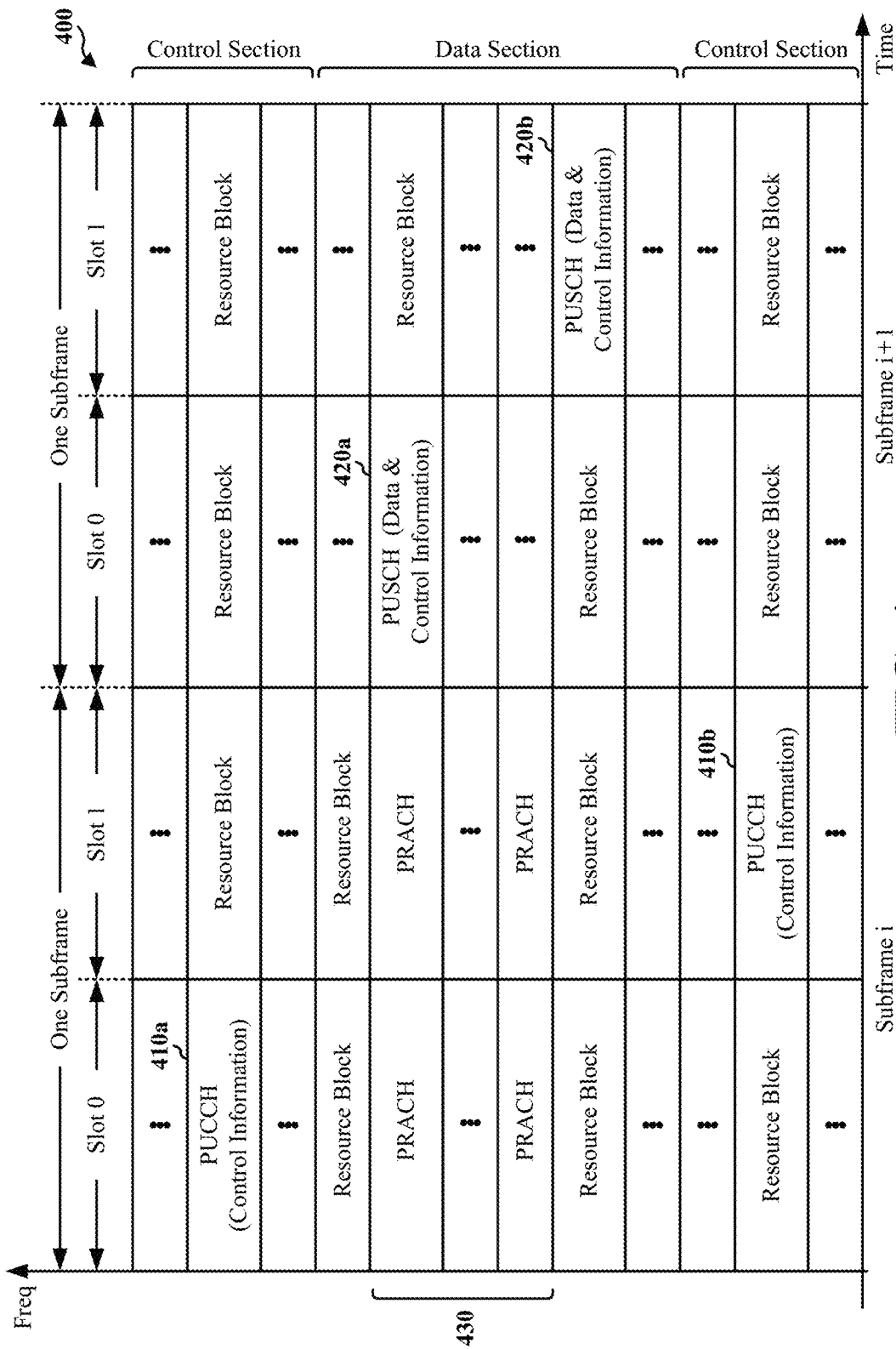
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
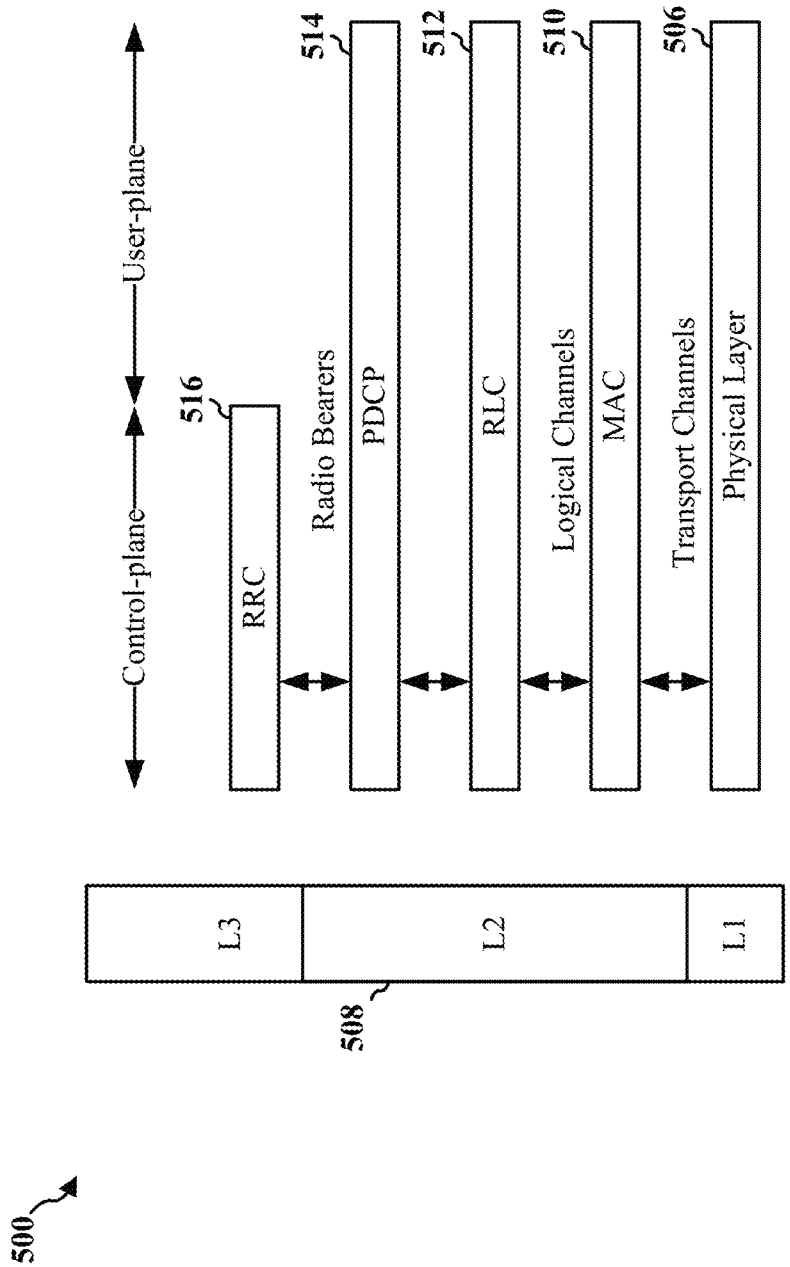
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506.

Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
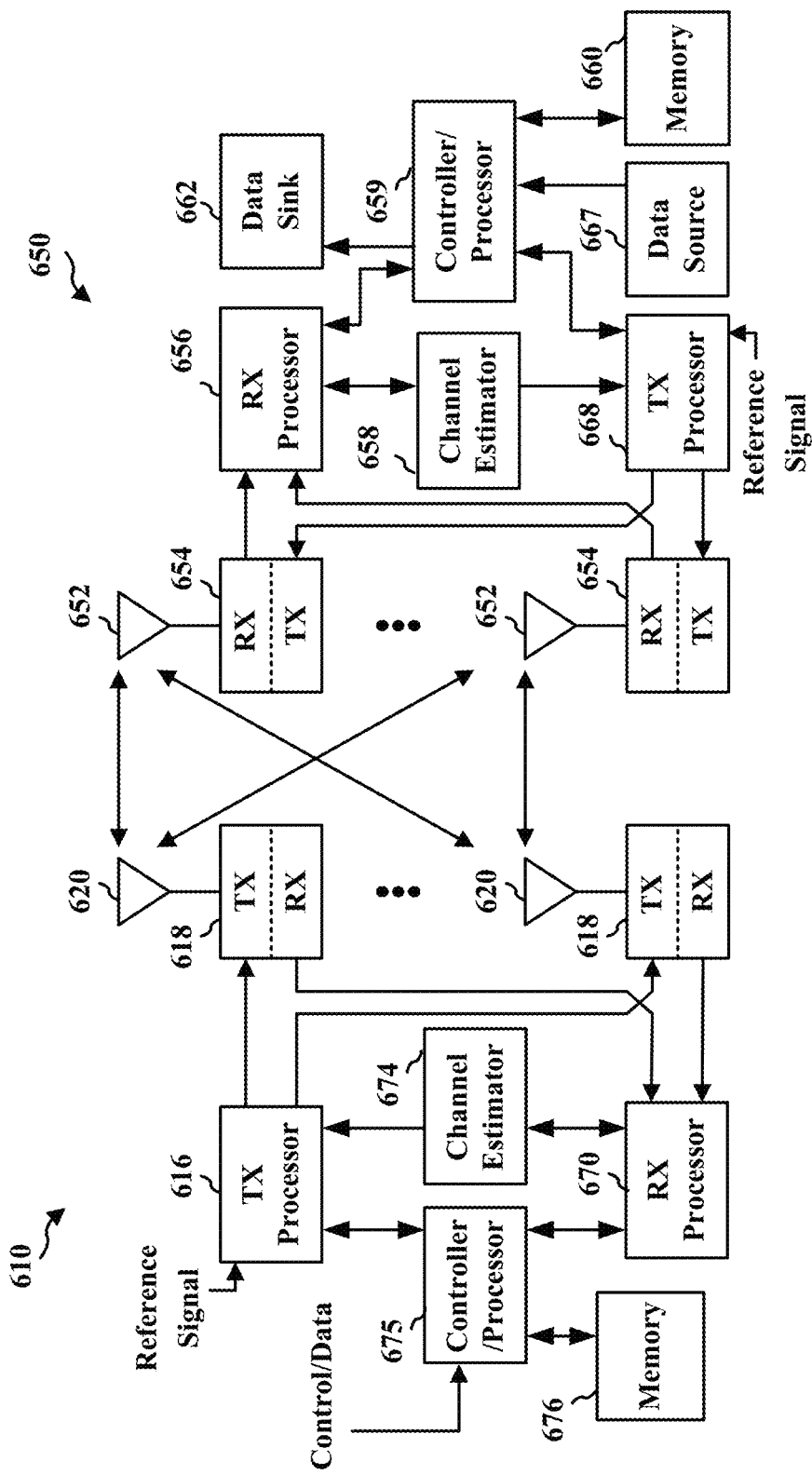
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
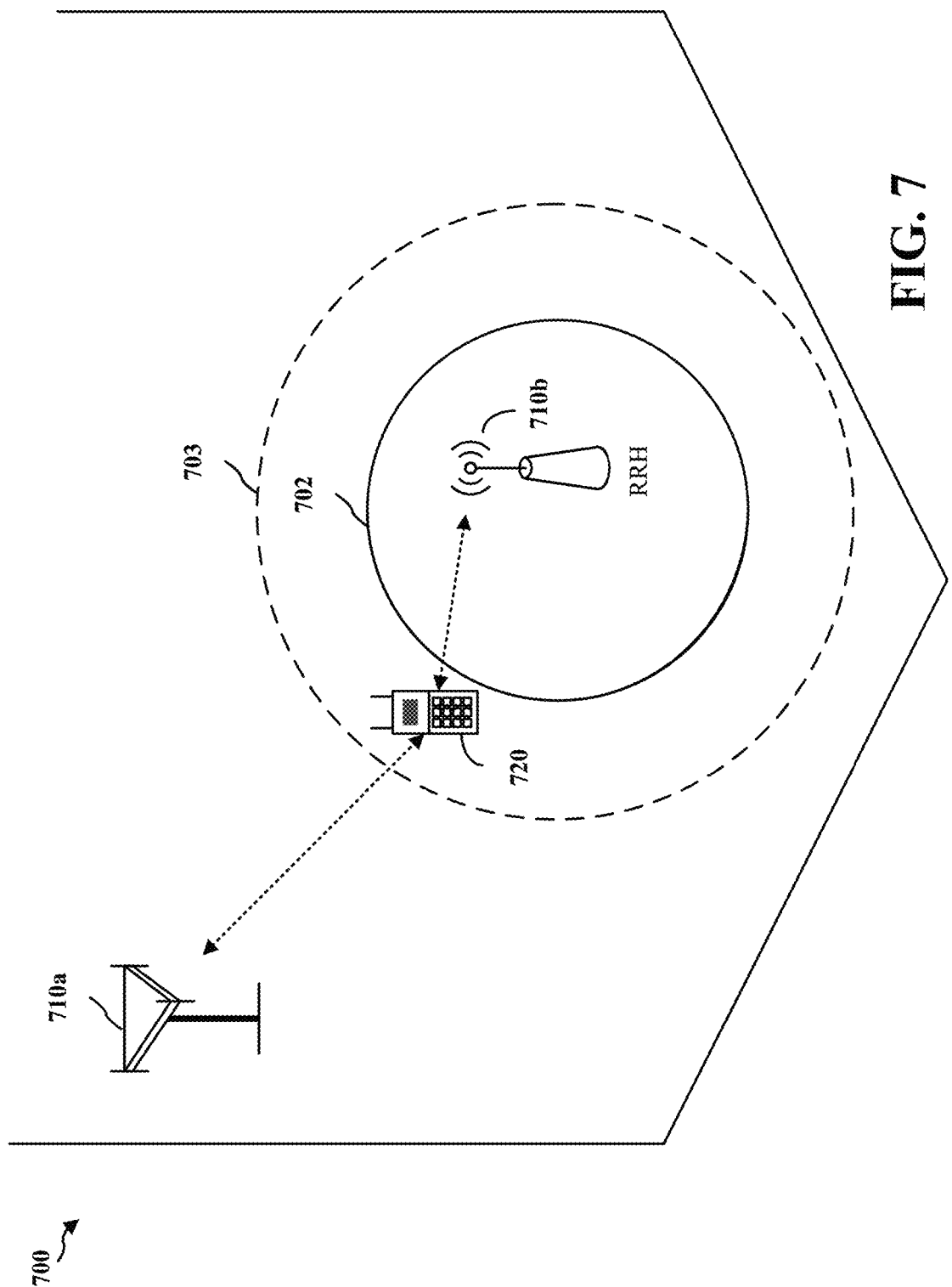
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710*b* may have a range expanded cellular region 703 that is expanded from the cellular region 702 through enhanced inter-cell interference coordination between the RRH 710*b* and the macro eNB 710*a* and through interference cancellation performed by the UE 720. In enhanced inter-cell interference coordination, the RRH 710*b* receives information from the macro eNB 710*a* regarding an interference condition of the UE 720. The information allows the RRH 710*b* to serve the UE 720 in the range expanded cellular region 703 and to accept a handoff of the UE 720 from the macro eNB 710*a* as the UE 720 enters the range expanded cellular region 703.

Figure 8:
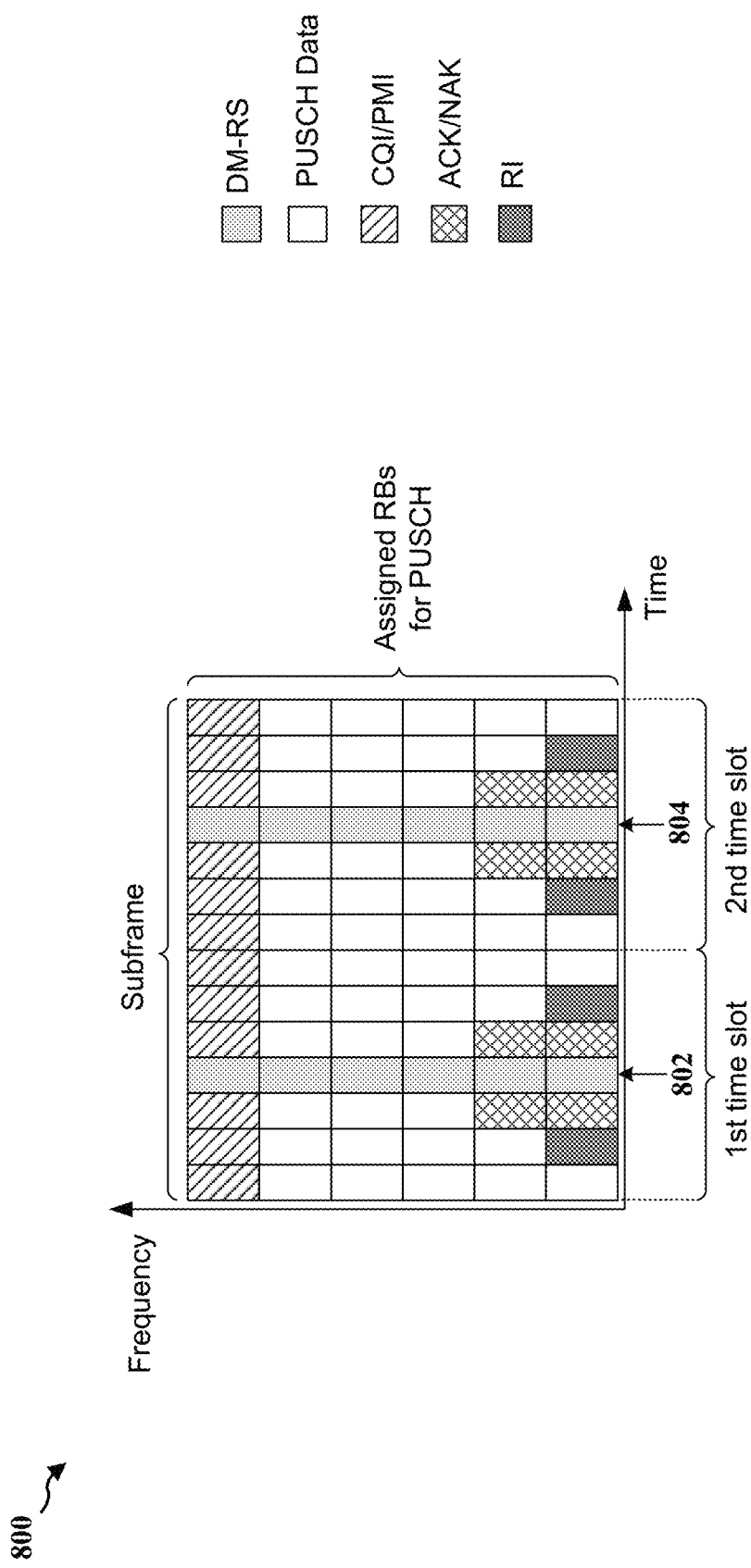
FIG. 8 is a diagram illustrating an UL subframe of a UE.

FIG. 8 is a diagram illustrating a UL subframe 800 of a UE. In an aspect, as shown in FIG. 8, a UE may transmit a UL demodulation reference signal (DM-RS) to a base station in one or more symbols (e.g., symbols 802 and 804) of the UL subframe 800. The UE may further transmit uplink control information (UCI) to the base station. For example, the UCI may include a scheduling request (SR), a channel quality indicator (CQI), a precoding matrix indicator (PMI), a precoding type indication (PTI), a rank indicator (RI), and/or an acknowledgment (ACK) or negative acknowledgement (NACK). In the LTE standard, the UL DM-RS typically has a fixed overhead. For example, as shown in FIG. 8, the UL DM-RS is transmitted in fixed symbol positions for a cyclic prefix (CP) type. In an aspect, the UCI may be piggybacked on PUSCH to maintain a single-carrier (SC) waveform (e.g., the UCI may be transmitted on PUSCH, instead of being transmitted on PUCCH in parallel with PUSCH) and avoid transmitting both PUCCH and PUSCH in the same slot. Piggybacking the UCI on PUSCH has the benefit of increasing the rate at which the UE can transmit UCI. However, those UCI transmitted on the PUSCH are susceptible to higher interference (e.g., more variable SINR or data collisions) and are generally transmitted at a lower transmit power relative to IoT.

For example, for normal CP, the DM-RS is included in the middle of a time slot (e.g., the first time slot and the second time slot in FIG. 8). In an aspect, as shown in FIG. 8, PUSCH data is rate matched around CQI/PMI/RI, but is punctured by ACK/NAK. For example, in the configuration of FIG. 8, an ACK/NAK may be transmitted in symbols adjacent to DM-RS, and RI may be transmitted in symbols adjacent to ACK/NAK. This positioning improves the likelihood that these symbols can be demodulated.

The LTE standard (e.g., LTE Release 10) supports simultaneous PUCCH and PUSCH transmission by a UE in one subframe, where previously a UE could only transmit PUCCH or PUSCH in a given subframe. With simultaneous PUCCH and PUSCH transmission by a UE, the single-carrier (SC) waveform property may no longer be maintained. In an aspect, an eNB may semi-statically configure a UE to concurrently transmit (also referred to as parallel transmission) the PUCCH and PUSCH in one UL subframe. If a UL subframe is configured for parallel transmission of the PUCCH and PUSCH, and the scheduled UCI for that UL subframe includes ACK/NAK only or channel state information (CSI) only, the UE may transmit ACK/NAK or CSI on PUCCH, and UL data on PUSCH. However, if the UL subframe is configured for parallel transmission of the PUCCH and PUSCH, and the scheduled UCI includes both ACK/NAK and CSI, ACK/NAK is transmitted on PUCCH, while CSI and UL data are transmitted on PUSCH. In other words, CSI is piggybacked on PUSCH (i.e., transmitted on the PUSCH region, instead of in the PUCCH region). By this behavior, the transmission of ACK/NACK is prioritized over CSI for transmission in the PUCCH.

Conventionally, UL DM-RS overhead may be fixed for all UL ranks For example, if the last symbol of a UL subframe is not configured for (potential) SRS transmissions, the UL DM-RS overhead for normal CP may be approximately two symbols (e.g., symbols 802 and 804 in FIG. 8) of the 14 symbols in the UL subframe 800 (e.g., $2/14=14.3\%$). If the last symbol is configured for (potential) SRS transmissions, UL DM-RS overhead for normal CP may be approximately two symbols (e.g., symbols 802 and 804 in FIG. 8) of 13 available symbols in the UL subframe (e.g., $2/13=15.4\%$).

In an aspect, a UE may apply a UL DM-RS overhead reduction scheme for a UL subframe. For example, a UE served by a small cell may observe favorable channel conditions and may reduce the number of resources for transmission of DM-RS to improve UL efficiency. In one aspect, a UL DM-RS overhead reduction scheme applied by the UE may configure the subframe to include only one DM-RS symbol. For example, a symbol in the first slot of the UL subframe may be used for transmission of DM-RS 802, while symbol 3 804 in the second slot of the UL subframe may be used for PUSCH data.

In another aspect, a UL DM-RS overhead reduction scheme applied by the UE may allow for frequency-domain DM-RS reduction. In such aspect, DM-RS may not be present in all resource elements and/or resource blocks. For example, DM-RS may be present in one of every N adjacent resource elements, or DM-RS may be present in one of every N resource blocks (e.g., where N can be an integer value of 2, 3, 4).

In another aspect, a UL DM-RS overhead reduction scheme applied by the UE may enable time-division multiplexing (TDM) such that DM-RS and UL data are transmitted in one symbol. In other words, a symbol may be partitioned into two or more sub-symbols. One sub-symbol may carry DM-RS, and another sub-symbol may carry UL data. In such aspect, a guard period/CP may be included between the DM-RS and the UL data. That is, the original DM-RS symbol may be configured to have three sequential time portions, such that a first time portion includes a CP and the DM-RS, a second time portion serves as a guard period, and a third time portion includes a CP and PUSCH data. This aspect differs from the use of short block DM-RS in that the DM-RS and CP may be positioned in the center symbol of the slot, and may be preceded or followed by a data sub-symbol and CP. Furthermore, the DM-RS may be shorter than a short block DM-RS.

When a UE applies a UL DM-RS overhead reduction scheme for a UL subframe, the UE may select an appropriate scheme for transmitting UCI in the same UL subframe. In one aspect, the UE may enable concurrent transmission of the PUCCH and PUSCH in the UL subframe when a UL DM-RS overhead reduction scheme is applied in order to provide sufficient performance for UCI. In such aspect, ACK/NAK may be transmitted on PUCCH. RI may be transmitted on either PUCCH or PUSCH. CQI/PMI may be transmitted on PUCCH or PUSCH. It should be noted that CSI may be periodic CSI or aperiodic CSI. In an aspect, periodic CSI and aperiodic CSI may be handled in a similar or different manner. For example, the UE may transmit periodic CSI on PUCCH and may transmit aperiodic CSI on PUSCH. Furthermore, the periodic CSI and aperiodic CSI may or may not be transmitted in different subframes.

In another aspect, the UE may apply a separate configuration offset associated with a UL DM-RS overhead reduction scheme for transmission of UCI in the UL subframe. The configured offset corresponds to the number of REs used for UCI piggybacked on PUSCH. A larger offset value implies that a larger number of REs allocated to UCI on PUSCH and consequently, fewer number of REs remaining for UL data on PUSCH. For example, when the UE piggybacks UCI on PUSCH, the number of REs occupied by UCI may depend on PUSCH parameters and a semi-statically configured offset ($\beta$), e.g., configured by RRC. In an aspect, the offset may be separately configured for ACK/NAK, RI, and/or CQI/PMI. That is, ACK/NAK, RI, or CQI/PMI may each be associated with a different offset value.

In an aspect, if the UE applies a DM-RS overhead reduction scheme to a UL subframe only for some PUSCH transmissions (e.g., UL DM-RS overhead reduction scheme is enabled but not applied for SPS transmissions), the UE may apply one of two separate offset configurations. For example, the UE may apply a first offset ($\beta$) when the UE does not apply a UL DM-RS overhead reduction scheme to a UL subframe and may apply a second offset ($\beta'$) when a UL DM-RS overhead reduction scheme is applied to a UL subframe. By using different offsets, UCI piggybacked on PUSCH can still achieve appropriate performance target for both the case when there is no DM-RS reduction and the case when there is DM-RS reduction. In an aspect, the second offset ($\beta'$) may be configured to be the first offset ($\beta$) adjusted by a delta value (e.g., $\beta'=\beta+$delta value).

In an aspect, the possible values for $\beta'$ for a particular UCI type (e.g., ACK/NAK, RI, or CQI/PMI) may be the same as the values for $\beta$ (where $\beta$ and $\beta'$ may each be either a single value for all UCI types or a set of values corresponding to different or combinations of UCI types). Alternatively, the possible values for $\beta'$ maybe different from the values for $\beta$ (e.g., the $\beta'$ may have an increased range of values with respect to $\beta$). A UE may determine whether to apply $\beta$ or $\beta'$ for a particular UL subframe based on whether or not the UE is to apply a UL DM-RS overhead reduction scheme for the UL subframe.

In an aspect, ACK/NAK may be included in both slots (e.g., the first and second time slots of a UL subframe) when a UL DM-RS overhead reduction scheme is not applied by the UE for a UL subframe. However, a different offset (e.g., $\beta'$) may be applied by the UE when a UL DM-RS overhead reduction scheme is applied by the UE for a UL subframe to overcome potential performance differences due to the reduced DM-RS overhead (e.g., as compared with the regular DM-RS overhead case).

In an aspect, the UE may determine that for transmission of at least some UCI (or all UCI), the at least some UCI is mapped to resource elements in one of the two time slots of the UL subframe based on the presence and location of the DM-RS. As an example, at least one ACK/NAK piggybacked on PUSCH may be included in a time slot where DM-RS is present. For example, if UL DM-RS is included in the first time slot but not the second time slot, the UE may include an ACK/NAK in the first time slot. In such example, the UE may not include an ACK/NAK in the second time slot since no DM-RS is included in the second time slot. In an aspect, the number of symbols for ACK/NAK may remain 2 symbols, adjacent to the symbol that includes DM-RS. Alternatively, the UE may include ACK/NACK in more than two symbols of the subframe. For example, in addition to symbol 2 and symbol 4 of the first time slot, the UE may further include ACK/NACK in symbol 0 and symbol 6 of the first time slot, such that a total of four symbols are used for transmission of ACK/NAK in only the first time slot of the UL subframe.

In an aspect, the UE may apply the previously described scheme for transmission of ACK/NACK in a similar manner for the transmission of RI in the UL subframe. For example, when a DM-RS resource overhead reduction scheme is applied by the UE that places the DM-RS in the first time slot, the UE may include RI in two symbols within the first time slot of the UL subframe, and not the second time slot. In an aspect, the UE may apply the previously described scheme for transmission of ACK/NACK in a similar manner for the transmission of CQI/PMI. For example, the UE may include CQI/PMI in the first time slot of the UL subframe, and not the second time slot. In other aspects, however, the UE may include CQI/PMI in both first and second time slots of the UL subframe.

In an aspect, the number of resource elements to be used for transmission of UCI on PUSCH when the UE applies a DM-RS overhead reduction scheme for a UL subframe may be based on PUSCH parameters and an offset value. For example, such offset value may be separately configured from an offset value applied by the UE for transmission of UCI when the UE does not apply a UL DM-RS overhead reduction scheme. If the UE transmits UCI only in one slot of a UL subframe, this implies that the computed resource elements are only mapped to one slot (instead of two slots).

In an aspect, a UE may determine that a UL DM-RS overhead reduction scheme should not be applied for a UL subframe when one or more conditions exist. For example, one such condition may include transmission of a PUSCH associated with a random access response grant (e.g., for contention-based random access procedure) in the UL subframe. For a non-contention based random access procedure, the UE may apply either a regular or reduced UL DM-RS overhead. Another such condition may include application of semi-persistent scheduling (SPS) to the PUSCH in the UL subframe, since it may be preferable to have regular UL DM-RS due to lack of fast rate adaptation. Another such condition may include transmission of A-CSI only on the PUSCH in the UL subframe. For example, when A-CSI only transmission on PUSCH is triggered, regular DM-RS may be applied by the UE for the UL subframe. Another such condition may include PUSCH transmissions in the UL subframe scheduled by downlink control information (DCI) format 0 at least when DCI format 0 is received from the common search space, in order to provide necessary fallback operation. In an aspect, DCI format 0 in the UE-specific search space may still be associated with a UL DM-RS overhead reduction scheme. Another such condition may include transmission of a PUSCH of rank 3 or above in the UL subframe. For example, the UE may always use regular DM-RS for transmission of a PUSCH of rank 3 or above.

Figure 9:
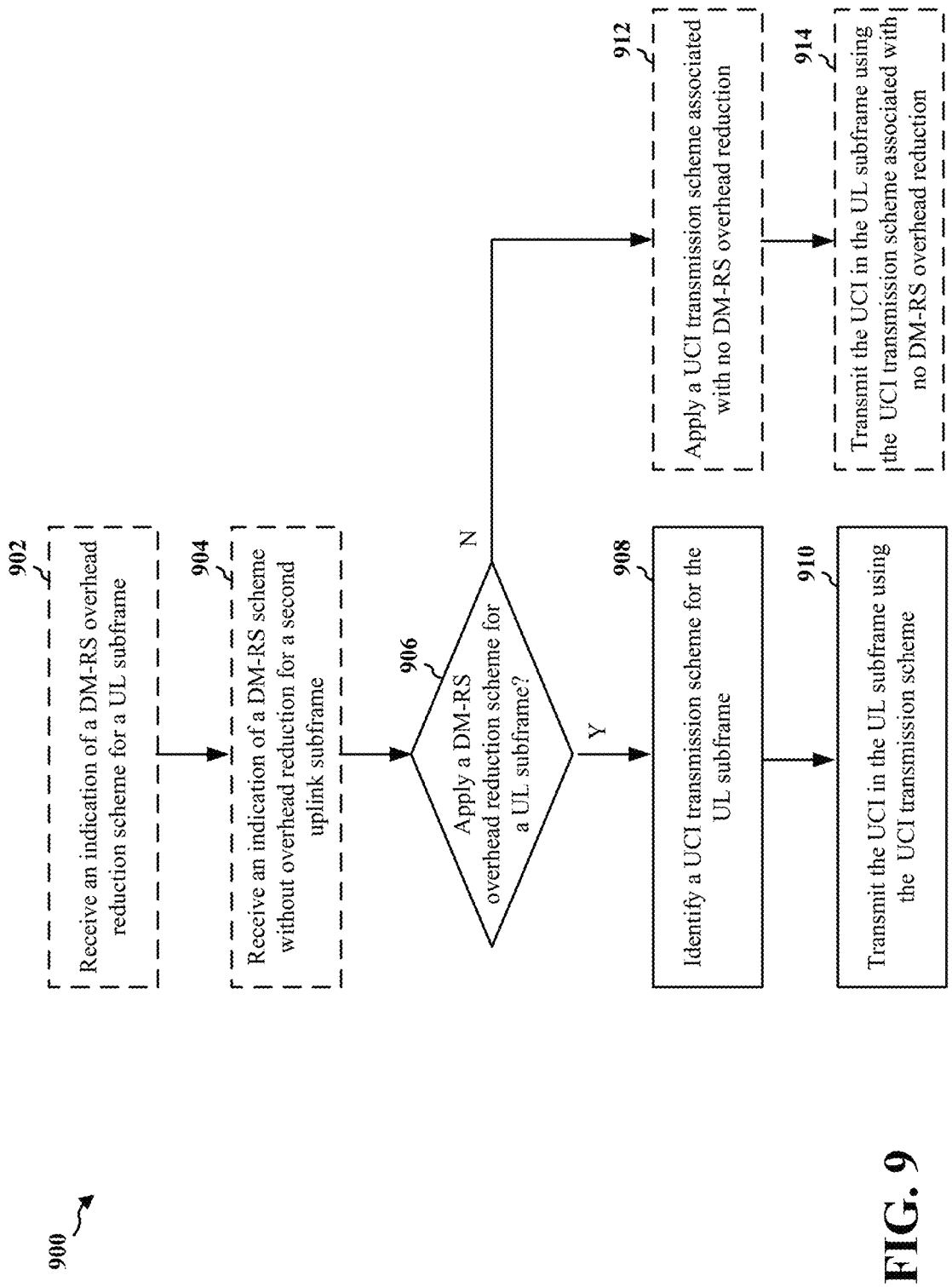
FIG. 9 is a flow chart of a method of wireless communication.

FIG. 9 is a flow chart 900 of a method of wireless communication. The method may be performed by a UE. It should be understood that the steps indicated with dashed lines in FIG. 9 represent optional steps.

At step 902, the UE receives an indication of a DM-RS overhead reduction scheme for a UL subframe, e.g., via an RRC configuration, a MAC indication, or a dynamic indication via a control channel.

At step 904, the UE receives an indication of a DM-RS scheme without overhead reduction for a second UL subframe.

At step 906, the UE determines whether to apply a DM-RS overhead reduction scheme for the UL subframe. In an aspect, the UE may determine to apply the DM-RS overhead reduction scheme based on the indication received in step 902. If the UE determines to apply a DM-RS overhead reduction scheme for the UL subframe (906), then the UE proceeds to step 908. Otherwise, if the UE determines not to apply the DM-RS overhead reduction scheme for the UL subframe (906), then the UE proceeds to step 912

At step 908, the UE may identify a UCI transmission scheme for the UL subframe. In an aspect, the identified UCI transmission scheme may include concurrent transmission of a PUCCH and a PUSCH in the UL subframe when the DM-RS overhead reduction scheme is applied, where one or more portions of the UCI are transmitted in the PUCCH or PUSCH or both. For example, the UCI may include at least one of a CQI, a PMI, a scheduling request (SR), an ACK, a NACK, a precoding type indicator (PTI), or an RI. In another aspect, the identified UCI transmission scheme may include allocating resources in the UL subframe for UCI transmission based on a configuration offset associated with the DM-RS overhead reduction scheme. For example, the resources allocated for UCI transmission in the UL subframe may include resources carrying a PUSCH. In another aspect, the UCI transmission scheme may include allocating resources in the second UL subframe for UCI transmission based on a configuration offset associated with the DM-RS scheme without overhead reduction.

At step 910, the UE may transmit the UCI in the UL subframe using the identified UCI transmission scheme.

At step 912, the UE may apply a UCI transmission scheme associated with no DM-RS overhead reduction. For example, the UE may determine not to apply the DM-RS overhead reduction scheme when transmitting a PUSCH associated with certain UCI, contention based communications, or transmission conditions is present. For example, the UE may determine not to apply the DM-RS overhead reduction scheme when transmitting a random access response grant in the UL subframe, SPS is applied to the PUSCH in the UL subframe, A-CSI only is triggered to transmit on the PUSCH in the UL subframe, PUSCH transmissions in the UL subframe are scheduled by DCI format 0, a PUSCH of rank 3 or above is transmitted in the UL subframe, or a combination thereof.

At step 914, the UE may transmit the UCI in the UL subframe using the UCI transmission scheme associated with no DM-RS overhead reduction.

Figure 10:
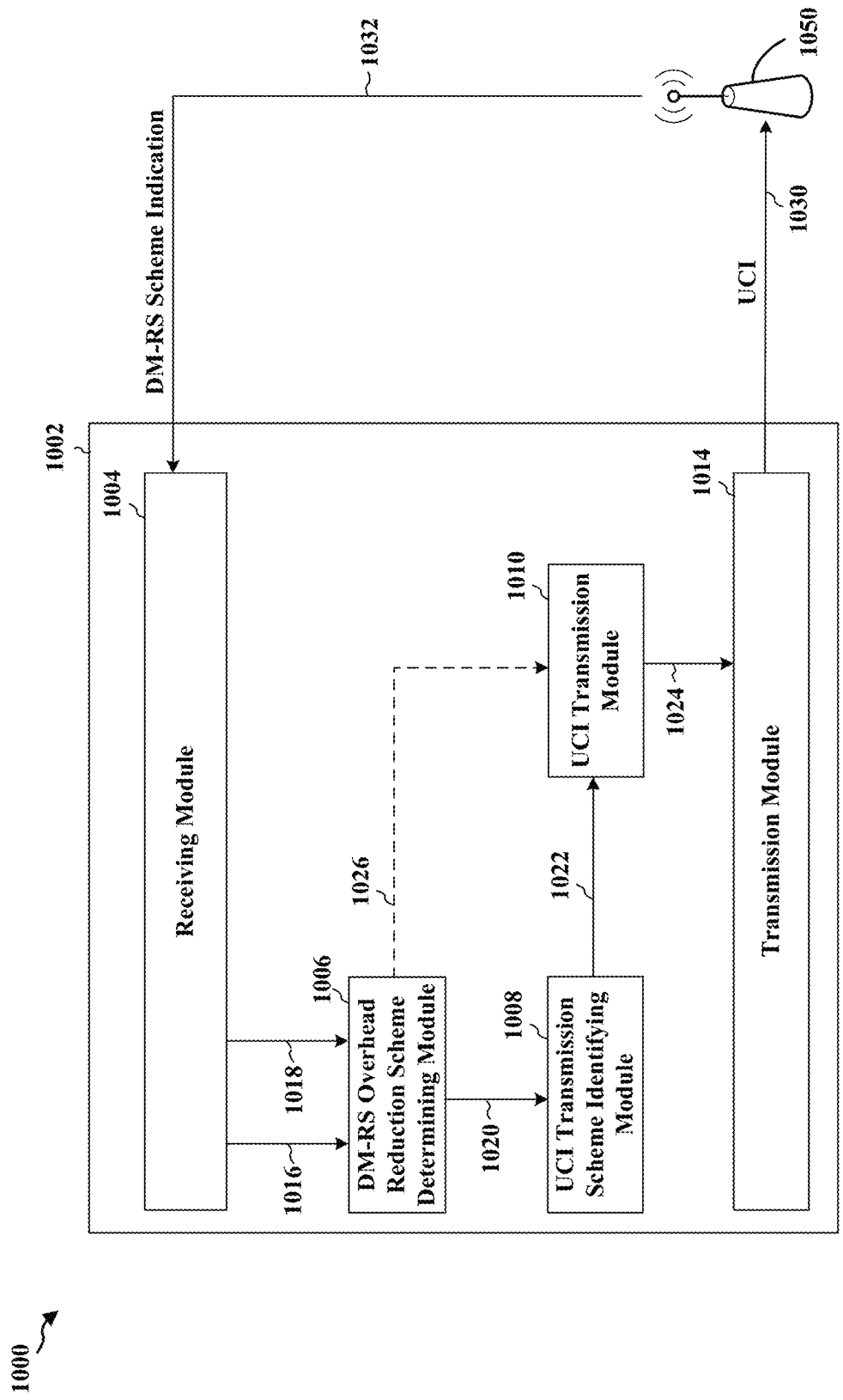
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The receiving module 1004 receives an indication of a DM-RS overhead reduction scheme for an uplink subframe or an indication of a DM-RS scheme without overhead reduction for a second uplink subframe. For example, the receiving module 1004 may receive DM-RS scheme indication 1032 from base station 1050, which may indicate a DM-RS overhead reduction scheme for an uplink subframe or a DM-RS scheme without overhead reduction for a second uplink subframe. The DM-RS overhead reduction scheme determining module 1006 determines whether to apply a DM-RS overhead reduction scheme for an uplink subframe. For example, the DM-RS overhead reduction scheme determining module 1006 may receive an indication 1016 of a DM-RS overhead reduction scheme for an uplink subframe and/or an indication 1018 of a DM-RS scheme without overhead reduction for a second uplink subframe. The DM-RS overhead reduction scheme determining module 1006 then determines whether to apply a DM-RS overhead reduction scheme based on indication 1016 and/or 1018. The DM-RS overhead reduction scheme determining module 1006 provides a signal 1020 indicating that the DM-RS overhead reduction scheme should be applied or provides a signal 1026 indicating that a UCI transmission scheme associated with no DM-RS overhead reduction should be applied. The UCI transmission scheme identifying module 1008 identifies a UCI transmission scheme for the uplink subframe based on whether the DM-RS overhead reduction scheme is applied. For example, the UCI transmission scheme identifying module 1008 may receive the signal 1020 indicating that the DM-RS overhead reduction scheme should be applied and may identify a UCI transmission scheme for the uplink subframe. The UCI transmission scheme identifying module 1008 may provide the identified UCI transmission scheme 1022 to the UCI transmission module 1010. The UCI transmission module 1010 transmits, via the transmission module 1014, the UCI 1024 in the uplink subframe using the UCI transmission scheme. For example, the UCI is transmitted to the base station 1050 using uplink signal 1030.

The apparatus may include additional modules that perform each of the blocks of the algorithm in the aforementioned flow chart of FIG. 9. As such, each block in the aforementioned flow charts of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
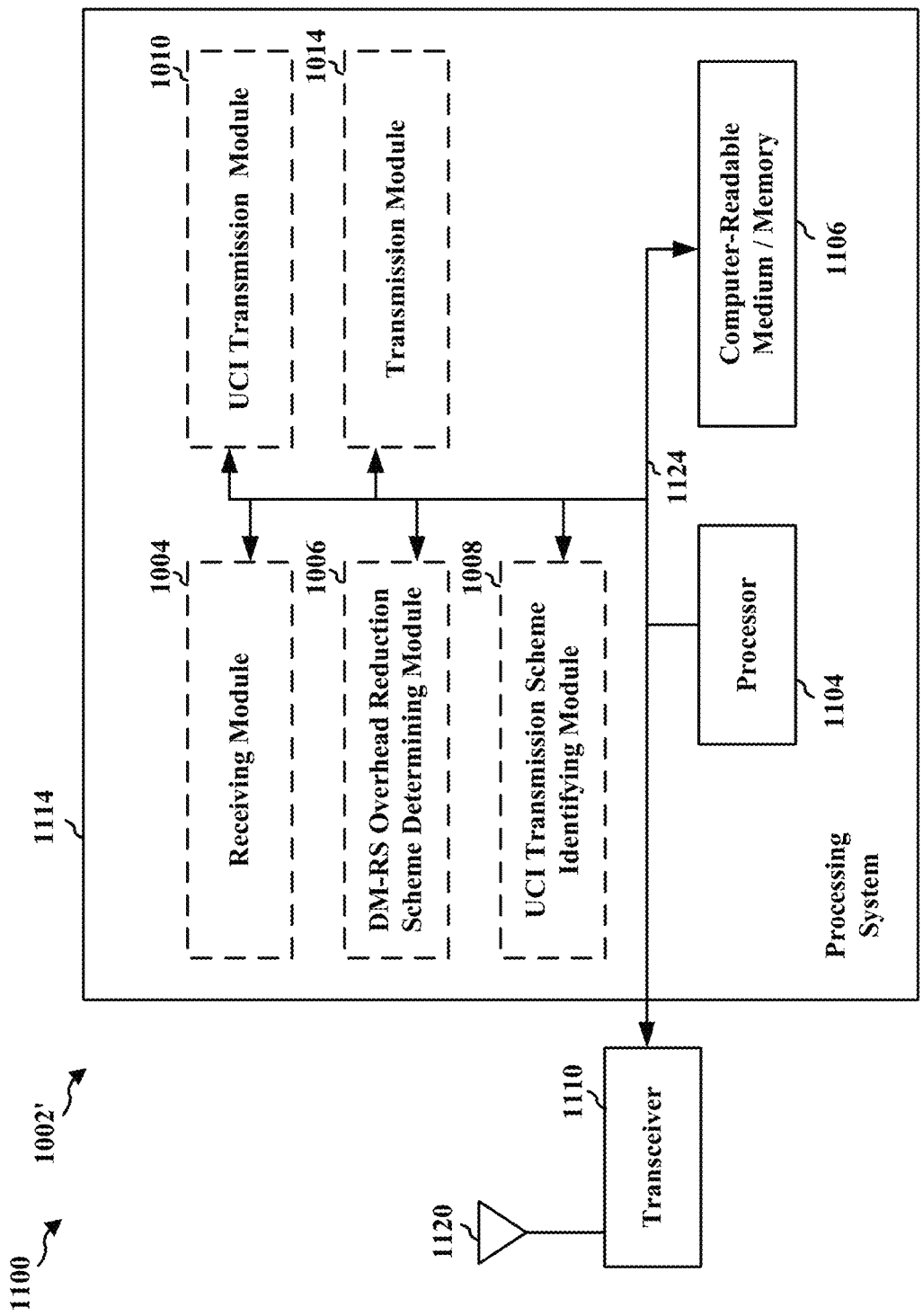
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, and 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception module 1004. In addition, the transceiver 1110 receives information from the processing system 1114, specifically the transmission module 1014, and based on the received information, generates a signal to be applied to the one or more antennas 1120. The processing system 1114 includes a processor 1104 coupled to a computer-readable medium/ memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the modules 1004, 1006, 1008, 1010, and 1014. The modules may be software modules running in the processor 1104, resident/stored in the computer readable medium/ memory 1106, one or more hardware modules coupled to the processor 1104, or some combination thereof. The processing system 1114 may be a component of the UE 650 and may include the memory 660 and/or at least one of the TX processor 668, the RX processor 656, and the controller/ processor 659.

In one configuration, the apparatus 1002/1002' for wireless communication includes means for means for determining whether to apply a DM-RS overhead reduction scheme for an uplink subframe, means for identifying a UCI transmission scheme for the uplink subframe based on whether the DM-RS overhead reduction scheme is applied, means for transmitting the UCI in the uplink subframe using the UCI transmission scheme, means for receiving an indication of the DM-RS overhead reduction scheme, where the determination is based on the indication of the DM-RS overhead reduction scheme, and means for receiving an indication of the DM-RS scheme without overhead reduction for a second uplink subframe.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   determining whether to apply a demodulation reference signal (DM-RS) overhead reduction scheme for an uplink subframe;
   selecting an uplink control information (UCI) transmission scheme for the uplink subframe based on whether the DM-RS overhead reduction scheme is applied for the uplink subframe, wherein a first UCI transmission scheme is selected when the DM-RS overhead reduction scheme is not applied and a second UCI transmission scheme is selected when the DM-RS overhead reduction scheme is applied; and
   transmitting the UCI in the uplink subframe using the selected UCI transmission scheme,
   wherein at least one of:
      the first UCI transmission scheme comprises a different offset configuration than the second UCI transmission scheme, or
      the first UCI transmission scheme does not comprise concurrent transmission of a physical uplink control channel (PUCCH) and a physical uplink shared channel (PUSCH) in the uplink subframe and the second UCI transmission scheme comprises concurrent transmission of the PUCCH and the PUSCH in the uplink subframe.

2. The method of claim 1, further comprising receiving an indication of the DM-RS overhead reduction scheme, wherein the determining is based on the indication of the DM-RS overhead reduction scheme.

3. The method of claim 1, wherein the first UCI transmission scheme does not comprise concurrent transmission of the PUCCH and the PUSCH in the uplink subframe and the second UCI transmission scheme comprises concurrent transmission of the PUCCH and the PUSCH in the uplink subframe when the DM-RS overhead reduction scheme is applied, and
   wherein one or more portions of the UCI are transmitted in the PUCCH, PUSCH, or both.

4. The method of claim 1, wherein the first UCI transmission scheme comprises a different offset configuration than the second UCI transmission scheme and the second UCI transmission scheme comprises allocating resources in the uplink subframe for UCI transmission based on a configuration offset associated with the DM-RS overhead reduction scheme.

5. The method of claim 4, wherein the resources allocated for UCI transmission in the uplink subframe comprise resources carrying the PUSCH.

6. The method of claim 1, wherein determining whether to apply the DM-RS overhead reduction scheme comprises determining not to apply the DM-RS overhead reduction scheme when
   a physical uplink shared channel (PUSCH) associated with a random access response grant is transmitted in the uplink subframe,
   semi-persistent scheduling (SPS) is applied to the PUSCH in the uplink subframe,
   aperiodic channel state information (A-CSI) only is triggered to transmit on the PUSCH in the uplink subframe,
   PUSCH transmissions in the uplink subframe are scheduled by downlink control information (DCI) format 0,
   a PUSCH of rank 3 or above is transmitted in the uplink subframe, or
   a combination thereof.

7. The method of claim 1, wherein the UCI comprises at least one of a channel quality indicator (CQI), a precoding matrix indicator (PMI), a scheduling request (SR), an acknowledgment (ACK), a negative acknowledgment (NACK), a precoding type indicator (PTI), or a rank indicator (RI).

8. The method of claim 1, wherein first UCI transmission scheme comprises a different offset configuration than the second UCI transmission scheme, the method further comprising receiving an indication of the DM-RS scheme without overhead reduction for a second uplink subframe, the UCI transmission scheme comprises allocating resources in the second uplink subframe for UCI transmission based on a configuration offset associated with the DM-RS scheme without overhead reduction.

9. The method of claim 1, wherein the UCI is only mapped to one of a plurality of slots in the uplink subframe.

10. An apparatus for wireless communication, comprising:
   means for determining whether to apply a demodulation reference signal (DM-RS) overhead reduction scheme for an uplink subframe;
   means for selecting an uplink control information (UCI) transmission scheme for the uplink subframe based on whether the DM-RS overhead reduction scheme is applied for the uplink subframe, wherein a first UCI transmission scheme is selected when the DM-RS overhead reduction scheme is not applied and a second UCI transmission scheme is selected when the DM-RS overhead reduction scheme is applied; and
   means for transmitting the UCI in the uplink subframe using the selected UCI transmission scheme,
   wherein at least one of:
      the first UCI transmission scheme comprises a different offset configuration than the second UCI transmission scheme, or
      the first UCI transmission scheme does not comprise concurrent transmission of a physical uplink control channel (PUCCH) and a physical uplink shared channel (PUSCH) in the uplink subframe and the second UCI transmission scheme comprises concurrent transmission of the PUCCH and the PUSCH in the uplink subframe.

11. The apparatus of claim 10, further comprising means for receiving an indication of the DM-RS overhead reduction scheme, wherein the determination is based on the indication of the DM-RS overhead reduction scheme.

12. The apparatus of claim 10, wherein the first UCI transmission scheme does not comprise concurrent transmission of the PUCCH and the PUSCH in the uplink subframe and the second UCI transmission scheme comprises concurrent transmission of the PUCCH and the PUSCH in the uplink subframe when the DM-RS overhead reduction scheme is applied, and
   wherein one or more portions of the UCI are transmitted in the PUCCH, PUSCH, or both.

13. The apparatus of claim 10, wherein the first UCI transmission scheme comprises a different offset configuration than the second UCI transmission scheme and the second UCI transmission scheme comprises allocating resources in the uplink subframe for UCI transmission based on a configuration offset associated with the DM-RS overhead reduction scheme.

14. The apparatus of claim 13, wherein the resources allocated for UCI transmission in the uplink subframe comprise resources carrying the PUSCH.

15. The apparatus of claim 10, wherein the means for determining whether to apply the DM-RS overhead reduction scheme is configured to determine not to apply the DM-RS overhead reduction scheme when
   a physical uplink shared channel (PUSCH) associated with a random access response grant is transmitted in the uplink subframe,
   semi-persistent scheduling (SPS) is applied to the PUSCH in the uplink subframe,
   aperiodic channel state information (A-CSI) only is triggered to transmit on the PUSCH in the uplink subframe,
   PUSCH transmissions in the uplink subframe are scheduled by downlink control information (DCI) format 0,
   a PUSCH of rank 3 or above is transmitted in the uplink subframe, or
   a combination thereof.

16. The apparatus of claim 10, wherein the UCI comprises at least one of a channel quality indicator (CQI), a precoding matrix indicator (PMI), a scheduling request (SR), an acknowledgment (ACK), a negative acknowledgment (NACK), a precoding type indicator (PTI), or a rank indicator (RI).

17. The apparatus of claim 10, wherein first UCI transmission scheme comprises a different offset configuration than the second UCI transmission scheme, the apparatus further comprising means for receiving an indication of the DM-RS scheme without overhead reduction for a second uplink subframe, the UCI transmission scheme comprises allocating resources in the second uplink subframe for UCI transmission based on a configuration offset associated with the DM-RS scheme without overhead reduction.

18. The apparatus of claim 10, wherein the UCI is only mapped to one of a plurality of slots in the uplink subframe.

19. An apparatus for wireless communication, comprising:
   a memory; and
   at least one processor coupled to the memory and configured to:

determine whether to apply a demodulation reference signal (DM-RS) overhead reduction scheme for an uplink subframe;

select an uplink control information (UCI) transmission scheme for the uplink subframe based on whether the DM-RS overhead reduction scheme is applied for the uplink subframe, wherein a first UCI transmission scheme is selected when the DM-RS overhead reduction scheme is not applied and a second UCI transmission scheme is selected when the DM-RS overhead reduction scheme is applied; and transmit the UCI in the uplink subframe using the selected UCI transmission scheme, wherein at least one of:

the first UCI transmission scheme comprises a different offset configuration than the second UCI transmission scheme, or the first UCI transmission scheme does not comprise concurrent transmission of a physical uplink control channel (PUCCH) and a physical uplink shared channel (PUSCH) in the uplink subframe and the second UCI transmission scheme comprises concurrent transmission of the PUCCH and the PUSCH in the uplink subframe.

20. The apparatus of claim 19, wherein the at least one processor is further configured to receive an indication of the DM-RS overhead reduction scheme, wherein the determination is based on the indication of the DM-RS overhead reduction scheme.

21. The apparatus of claim 19, wherein the first UCI transmission scheme does not comprise concurrent transmission of the PUCCH and the PUSCH in the uplink subframe and the second UCI transmission scheme comprises concurrent transmission of the PUCCH and the PUSCH in the uplink subframe when the DM-RS overhead reduction scheme is applied, and wherein one or more portions of the UCI are transmitted in the PUCCH, PUSCH, or both.

22. The apparatus of claim 19, wherein the first UCI transmission scheme comprises a different offset configuration than the second UCI transmission scheme and the second UCI transmission scheme comprises allocating resources in the uplink subframe for UCI transmission based on a configuration offset associated with the DM-RS overhead reduction scheme.

23. The apparatus of claim 22, wherein the resources allocated for UCI transmission in the uplink subframe comprise resources carrying the PUSCH.

24. The apparatus of claim 19, wherein determining whether to apply the DM-RS overhead reduction scheme comprises determining not to apply the DM-RS overhead reduction scheme when a physical uplink shared channel (PUSCH) associated with a random access response grant is transmitted in the uplink subframe, semi-persistent scheduling (SPS) is applied to the PUSCH in the uplink subframe, aperiodic channel state information (A-CSI) only is triggered to transmit on the PUSCH in the uplink subframe, PUSCH transmissions in the uplink subframe are scheduled by downlink control information (DCI) format 0, a PUSCH of rank 3 or above is transmitted in the uplink subframe, or a combination thereof.

25. The apparatus of claim 19, wherein the UCI comprises at least one of a channel quality indicator (CQI), a precoding matrix indicator (PMI), a scheduling request (SR), an acknowledgment (ACK), a negative acknowledgment (NACK), a precoding type indicator (PTI), or a rank indicator (RI).

26. The apparatus of claim 19, wherein first UCI transmission scheme comprises a different offset configuration than the second UCI transmission scheme, and wherein the at least one processor is further configured to receive an indication of the DM-RS scheme without overhead reduction for a second uplink subframe, the UCI transmission scheme comprises allocating resources in the second uplink subframe for UCI transmission based on a configuration offset associated with the DM-RS scheme without overhead reduction.

27. The apparatus of claim 19, wherein the UCI is only mapped to one of a plurality of slots in the uplink subframe.

28. A non-transitory computer-readable medium storing computer-executable code, comprising code to:

determine whether to apply a demodulation reference signal (DM-RS) overhead reduction scheme for an uplink subframe;

select an uplink control information (UCI) transmission scheme for the uplink subframe based on whether the DM-RS overhead reduction scheme is applied for the uplink subframe, wherein a first UCI transmission scheme is selected when the DM-RS overhead reduction scheme is not applied and a second UCI transmission scheme is selected when the DM-RS overhead reduction scheme is applied; and transmit the UCI in the uplink subframe using the selected UCI transmission scheme, wherein at least one of:

the first UCI transmission scheme comprises a different offset configuration than the second UCI transmission scheme, or the first UCI transmission scheme does not comprise concurrent transmission of a physical uplink control channel (PUCCH) and a physical uplink shared channel (PUSCH) in the uplink subframe and the second UCI transmission scheme comprises concurrent transmission of the PUCCH and the PUSCH in the uplink subframe.

* * * * *